Dec. 17, 1935.  J. S. WARD ET AL  2,024,617
DETERMINATION OF THE RUBBER CONTENT OF LATEX
Filed Dec. 21, 1932  3 Sheets-Sheet 3
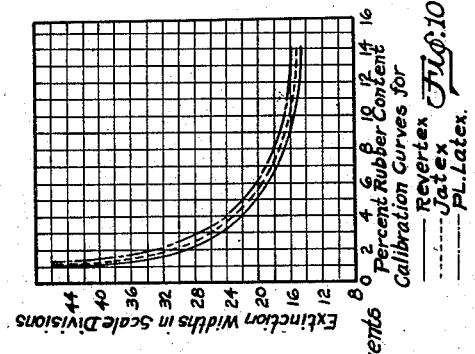
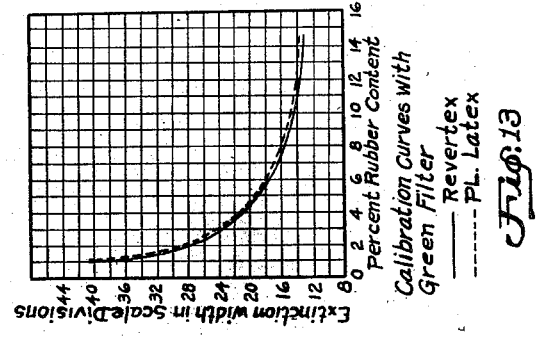
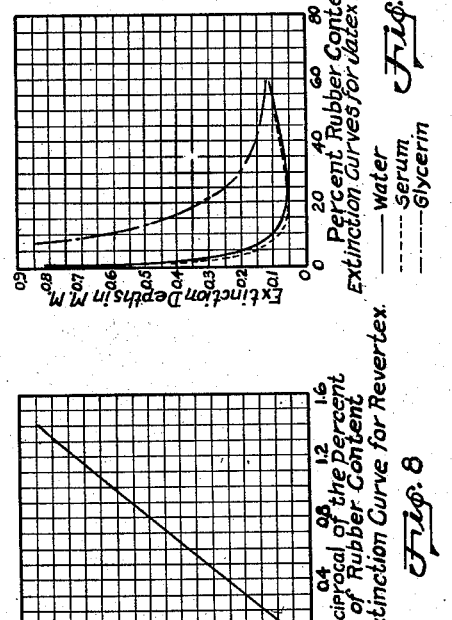
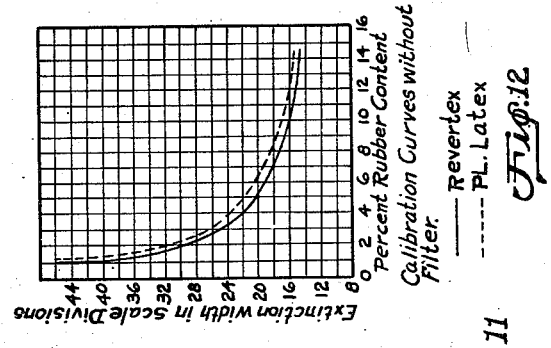
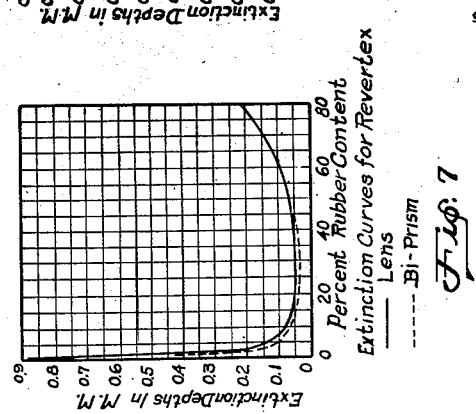
Inventors
John S. Ward and
Samuel D. Gehman
By
Attorney Patented Dec. 17, 1935

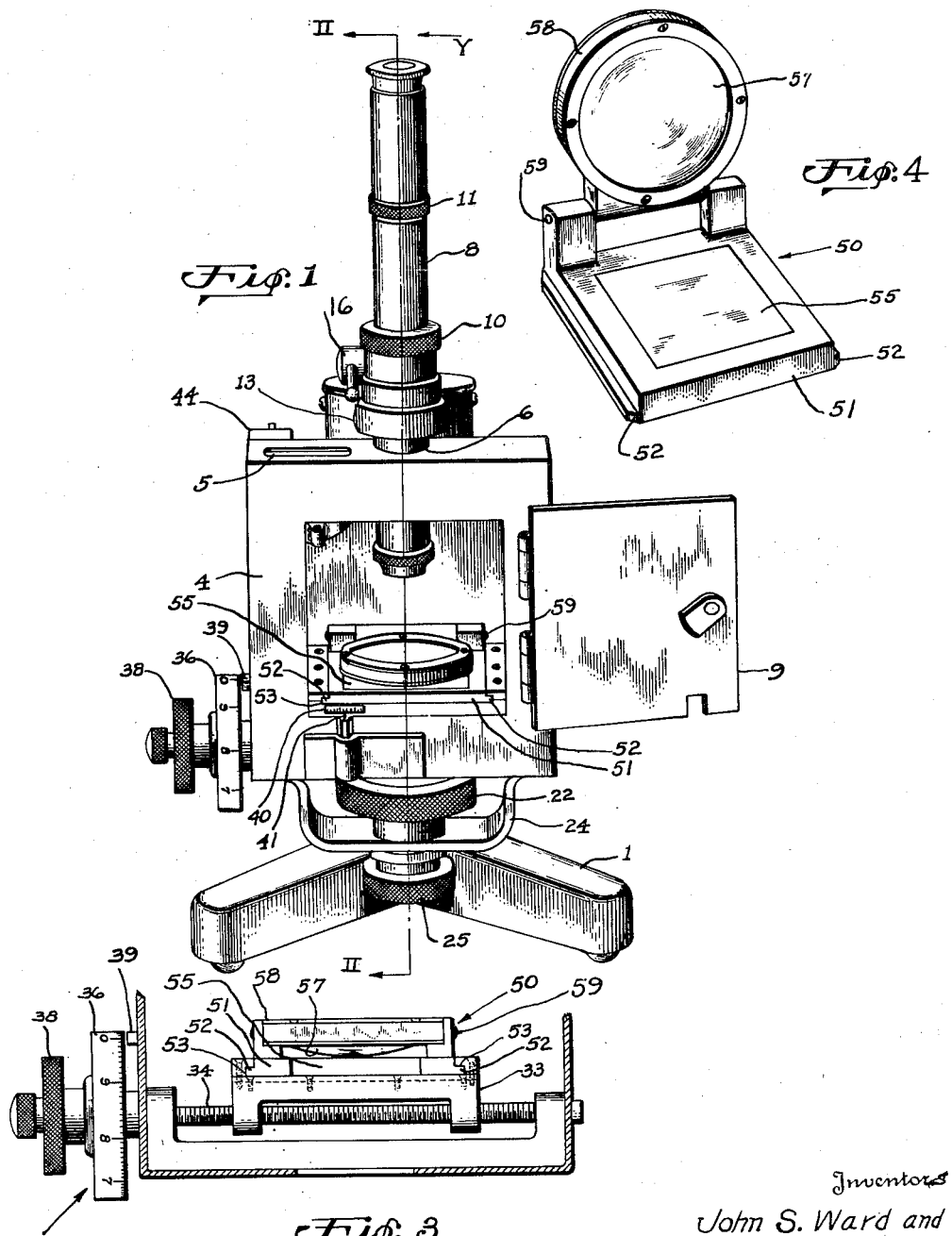

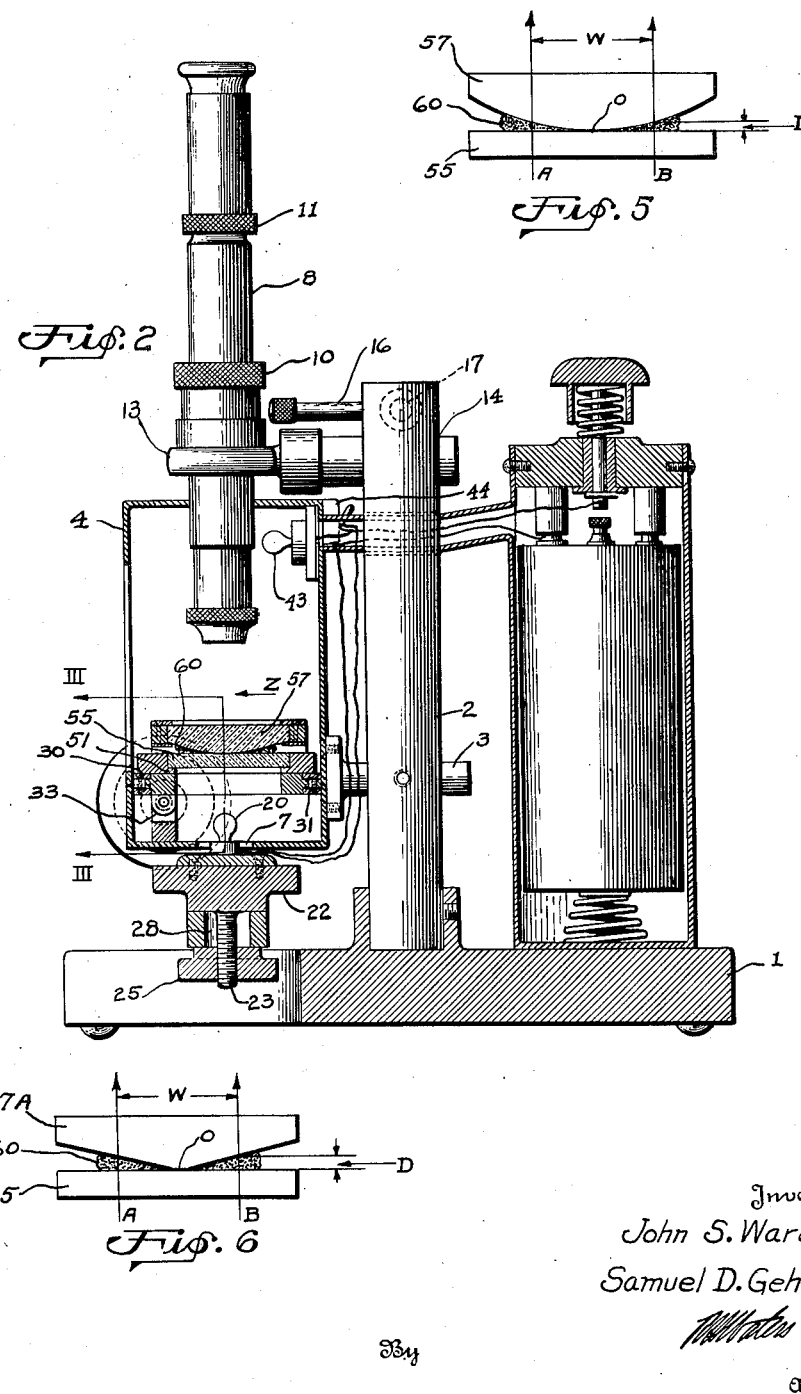

2,024,617

UNITED STATES PATENT OFFICE 2,024,617

DETERMINATION OF THE RUBBER CONTENT OF LATEX

John S. Ward and Samuel D. Gehman, Akron, Ohio, assignors to Wingfoot Corporation, Wilmington, Del., a corporation of Delaware Application December 21, 1932, Serial No. 648,219

1 Claim. (Cl. 88—14)

It is frequently desirable in the rubber industry to know the rubber content of latex. This latex, from which crude rubber is obtained by coagulation, is a white colloidal suspension of the consistency of thick cream and consists of rubber particles of various sizes suspended in a clear, straw-colored liquid. The actual distribution of the particle sizes, ranging usually from 0.5 to 2.0 microns, differs somewhat as between samples from different sources.

By knowing the rubber content of a sample of latex, its proper coagulation and uniformity in the properties of the resulting crude rubber are greatly facilitated. Since considerable latex is purchased by the crude rubber producers from various plantations, an accurate knowledge of the rubber content of the purchased latex assists in establishing a fair price for the same. Also, in their processes involving the use of latex, the rubber manufacturers have need for accurately knowing the rubber content of latex.

There are in general four methods, either in use or proposed, for the determination of the rubber content of latex; namely, trial coagulation, hydrometric, viscosimetric, and nephelometric.

Of these, trial coagulation is a standard precision method which comprises the rapid coagulation of a known amount of latex and the subsequent creping, drying and weighing, of the resulting rubber. This method is lengthy and, if shortened by omitting the final drying of the creped rubber and applying an arbitrary correction for the water content, results in loss of precision.

The hydrometric method, using laticometers, has enjoyed rather wide adoption but laticometers have been found by many experimenters to give unreliable rubber determination. The viscosity of either natural or treated latex has been found to be an unreliable criterion of the rubber content.

Nephelometric or turbidimetric methods offer the most desirable procedures for the determination of the rubber content of latex. The disappearance of a test object has long been employed as a means for comparing the turbidities of different liquids. However, ordinary turbidimeters cannot be used for the measurement of natural or moderately diluted latex because of its high turbidity.

The present invention has for one of its objects to provide an improved method of determining the rubber content of latex in which a turbidimeter of simple construction may be employed.

If an incandescent filament be viewed through a turbid suspension such as latex, the filament appears yellowish and surrounded by a field of less intense diffuse light. As the depth of the suspension is increased, the filament becomes redder and less intense with respect to the diffuse field and disappears when the two light intensities become approximately the same. The depth of the suspension for this apparent extinction of the filament depends upon the turbidity of the suspension which in turn depends upon the mean size and volumetric number of the suspended particles, the effective mean wave length or color of the light from the filament, and the refractive indices of the two phases of the suspension. Since the rubber content of latex depends upon the size and volumetric number of the rubber particles, this extinction for turbid suspensions can be used with proper precautions to determine the rubber content of either natural or concentrated latices.

In the accompanying drawings, Fig. 1 is a perspective view of a suitable turbidimeter showing a convenient form thereof;

Fig. 2 is a vertical transverse sectional view taken on line II—II of Fig. 1, looking in the direction of the arrow Y;

Fig. 3 is a fragmentary vertical sectional view taken on line III—III of Fig. 2, looking in the direction of the arrow Z;

Fig. 4 is a perspective view of one form of extinction cell which may be used in carrying out the present invention;

Figs. 5 and 6 are detailed elevational views of two forms of extinction cells;

Figs. 7 to 13 show curves plotted either as extinction curves or as calibration curves which further illustrate the invention. Similar characters of reference are employed in all of the hereinabove described views to indicate corresponding parts.

Referring more particularly to the drawings, reference character 1 indicates a base upon which is fixedly mounted a shaft 2. The shaft 2 supports a bracket 3 to which is fixed a light-proof cabinet 4 containing openings 5 and 6 at its upper end and an opening 7 at its lower end.

In the opening 6 is placed a microscope 8 of ordinary construction containing adjusting screws 10 and 11. The microscope 8 is supported by a bracket 13 located in an opening 14 near the upper end of the shaft 2. From a clamping means 16 through the opening 14 to another opening 17 is located a splined shaft (not shown). Thus, by turning the clamp 16, the bracket 13 may be suitably secured in the shaft 2.

In the opening 7 at the lower end of the light cabinet 4, a light bulk 20 of ordinary construction, such as a non-focusing flashlight bulb, is detachably and adjustably located. The light bulb 20 is detachably secured to a knurled nut 22 containing a threaded screw 23 which extends through a bracket 24 attached to the lower end of the light-proof cabinet 4. Threaded on the screw 23 is a knurled nut 25 for the purpose of locating the bulb 20 properly in the opening 7. It is apparent that by suitably adjusting the knurled nut 22 laterally with respect to the opening 28 in the bracket 24, the bulb 20 can be fixedly mounted in the desired position in axial alignment with the microscope 8.

Upon the grooved guideways 30 and 31 permanently mounted in the front and rear sides of the cabinet 4 is supported a microscope comparator 32 (see Fig. 3) comprising a traveling table 33 moved by a micrometer screw 34 provided with a head 36 which carries a micrometer scale for the accurate determination of the position of the table 33 upon the extinction of the filament of the bulb 20. The micrometer 34 is operated by a knurled head 38. A pointer on the bracket 39 fixedly mounted on the lightproof cabinet 4 is provided for indicating the micrometer reading on the head 36. A scale 40 attached to the comparator 32 is used for reading whole divisions in determining the position of the table 33 and the micrometer scale of the head 36, for reading fractional parts of the whole divisions. A pointer 41 permanently mounted on the outside of the lightproof cabinet is provided for indicating the reading on the scale 40. And for reading this scale when the door 9 of the lightproof cabinet is closed, a light bulb 43 supported on the inner rear wall of the lightproof cabinet 4 and arranged in parallel with the bulb 20 is provided. The switch 44 operates the bulb 43. When the light 43 is turned on, the scale 40 may be read by viewing it through the opening 5 in the lightproof cabinet 4. When not taking a reading, it is desirable to cover the opening 5.

Mounted on the traveling table 33 is an extinction cell 50, comprising a frame 51 with flanges 52 fitting in the guideways 53 of the traveling table 33 and fixed in the frame 51 is an ordinary flat glass plate 55. The top part of the extinction cell 50 comprises a spherical convex lens 57 mounted in the frame 58 and hinged to the frame 51 by means of a pin 59. In place of the spherical convex lens 57 a glass biprism 57A with the apex flattened, shown in Fig. 6, may also be used. Of course, any suitable arrangement of a glass plate for holding the sample to be tested in conjunction with a spherical convex lens or glass biprism may be used, the extinction cell herein described being used merely for convenience in operating the instrument. It is to be understood that the term extinction cell as used herein and in the appended claim comprises any such arrangement.

Upon the glass plate 55 of the extinction cell 50 is placed the sample of latex 60 for testing. If desired, the plate 55 may be of colored glass, thus acting as a color filter in addition to being the base plate for the extinction cell 50. Of course, a color filter may be introduced into any other suitable place in the system, such as interposed between the extinction cell 50 and the objective end of the microscope 8. Also, instead of a single-color filter, an adjustable color screen adapted to selectively interpose desired colors across the field of examination may be used.

In the operation of the instrument, the extinction cell 50, containing the sample of latex 60, the rubber content of which is to be determined, is placed upon the traveling table 33 with the bulb 20 aligned directly thereunder and in the field of view of the microscope 8. The door 9 of the light-proof housing 4 is closed and the source of light 20 sighted through the microscope 8, disclosing to the eye the image of the filament within a bright spot of less intensity than the image of the filament. The table is moved slowly by the operator through manipulation of the knurled head 38 of the micrometer screw in order to interpose the extinction cell 50 between the source of light 20 and the microscope 8 such that the filament is shown in its maximum brightness as viewed through the extinction cell. As the micrometer screw is moved clockwise or counter-clockwise from the point of maximum brightness of the filament, there is interposed in the line of vision a gradually increasing opacity, which causes the image of the filament to gradually fade away and ultimately disappear against a background of diffuse illumination of the microscope field.

This disappearance occurs at points equally distant from the center of maximum brightness. on each side of the point of maximum brightness. Referring to Figs. 5 and 6, the depth D of the optical path through the latex within the cell is varied by rotating the knurled head 38 on the micrometer screw 34 and thus shifting the cell sideways until extinction of the light filament in the microscope field is obtained at A and also at B on both sides of the clear central spot O (the point of maximum brightness of the image of the filament).

The distance W between the points of extinction A and B as indicated by the scales 40 and 36 is dependent upon the amount of opacity in the latex film in the extinction cell, the film regularly increasing in thickness from the center of the cell. The greater the opacity of the latex, the less will be the distance which the cell must be moved from the point of maximum brightness of the filament to the points of extinction thereof. The resulting scale reading is then compared with a table of predetermined and established standard readings computed by the trial coagulation or other method, so that the amount of turbidity possessed by the fluid is directly obtained by such reading and reference comparison, the standard readings being obtained by a series of examinations of latices of varying accurately known quantities of rubber.

Although the rubber content of any aqueous suspension of rubber may be measured by this instrument, for the sake of convenience only tests of samples of ammonia-preserved plantation latices, Revertex, a commercial latex concentrated by evaporation to approximately 80% rubber content, and Jatex, a commercial latex concentrated by centrifuging to approximately 60 percent rubber content, will be illustrated. In the data hereinafter presented, distilled water is used as the diluent except where otherwise noted.

In order to further illustrate the invention, Figs. 7 to 13 showing numerous curves plotted either as extinction curves or calibration curves are provided. In Fig. 7 extinction curves for Revertex using the spherical convex lens and also the biprism in the extinction cell are shown. As seen from a perusal of the succeeding figures, these curves are characteristic of the curves for other samples of latex.

Referring to the curves in Fig. 7, the extreme turbidity of latex is noted by the fact that latex films of 20 to 40% rubber content thicker than 0.05 mm. completely obscure the incandescent filament. Ordinary plantation latex generally has a rubber content of 30 to 35%. This table further shows that extinction cells containing either a lens or a special biprism give closely comparable results. However, because of its simplicity and convenience in practice together with its easy procurability, the lens type of cell is probably the more convenient to use.

The straight line portion of the curve of Fig. 8, showing the relation between extinction depths and reciprocales of rubber content, indicates that the turbidity of water diluted latex obeys the concentration-turbidity law when the rubber content does not exceed 15%. Fig. 9 shows the change in the character of the extinction curves when latex serum or glycerin is used as the diluent for latex instead of water. The use of latex serum as a diluent does not eliminate the minimum in the extinction curves but gives an extinction curve very similar to that obtained with water as a diluent.

Fig. 10 shows the calibration curves for two samples each of plantation latex, Revertex and Jatex. The two samples of each of these types of latex give practically identical calibration curves. Therefore the calibration curves for these six samples are shown as one curve for each type of latex. The observed differences in the three calibration curves are probably due to differences in the effective mean particle size in these various types of latex.

Since the turbidity of latex depends upon the particle size and the color of the transmitted light, it is possible to minimize this effect of particle size by using color filters as disclosed above. In Fig. 11 are shown calibration curves for Revertex obtained with and without color filters, none of which transmitted mono chromatic light. Of these, the green filter is recommended for use in the determination of the rubber content of latex since it is more pleasing to the observer, yields a more sensitive balance, and decreases the spread between the calibration curves for different latices. In Figs. 12 and 13 are calibration curves for Revertex and plantation latex obtained without and with the green filter, respectively. As is readily apparent, the use of a green filter brings about a considerable decrease in the spread of the two calibration curves.

In making tests with ordinary plantation latex, it is desirable to dilute the latex with water or some other suitable diluent because of the fact that its rubber content falls in the region of the minimum of the extinction curve where two values of the rubber content correspond to a single value of the extinction depth (see Fig. 7). This results in an ambiguity in coverting values of extinction depth into rubber content if this region of the extinction curve should be used as a calibration curve for the instrument. To avoid this ambiguity, a known dilution of the unknown latex, such as a one-tenth dilution of plantation latex is used. It is then possible to use curves plotted between extinction widths in micrometer-scale divisions and per cent rubber content up to 10 to 14 per cent as calibration curves for the instrument.

The advantages of using a filter are readily seen by referring to Figures 12 and 13. For example, an unknown sample of latex is diluted one part in ten with water and extinction widths of 24 and 22 scale divisions are observed, respectively, without and with the green filter. Without the filter, the calibration curves with a simple multiplication of 10 would indicate a rubber content of 33 or 39%, depending upon the choice from the two calibration curves in Figure 12. With the filter, the two computed values would be 34 to 35%, as seen in Figure 13.

Thus, the microturbidimeter with a green light filter permits the determination of the rubber content of latex with a probable precision of less than 1% rubber content in 35% latex. The time required for this determination is less than five minutes as compared with two or more hours for the long method involving coagulation, creping, and drying, or a probable half hour for the less-accurate short method of coagulation and creping without drying.

Another use for this microturbidimeter is in the measuring of particle size of pigments such as zinc oxide, iron oxide and carbon black. One method which we have found to be quite accurate and highly efficient is that based on the turbidity of xylene-rubber-pigment cements, prepared by milling the pigment into the rubber and swelling the mixture in xylene. It is of course to be understood that this microturbidimeter may be used also for measuring the particle size of pigments in aqueous or other media.

In general, the method of determining the particle size involves calibration of the instrument using a direct method of particle-size measurement. With some pigments, such as zinc oxide, an extinction curve with a minimum is obtained when the extinction depths for suspensions of the same concentration are plotted against the particle size. In such a case, the possible ambiguity as to which side of the minimum the pigment belongs may be overcome by taking readings with different color filters, e. g., with a blue filter and with a red filter or with an adjustable color screen. The ratios of the readings taken with these two different filters are not the same on the two sides of the minimum.

From the above considerations it will be seen that a high precision instrument is provided with which turbidity determinations of a fluid may be quickly made. It will be understood that the details of the instrument as herein specifically described and illustrated may be varied without departing from the inventive concept; also, that it is desired to embrace within the scope of this invention such modifications and changes as may be necessary to adapt it to varying conditions and uses. It is intended that the patent shall cover by suitable expression in the appended claim whatever features of patentable novelty reside in the invention.

What is claimed is:

The method of determining the rubber content of a dispersion of rubber-like material which comprises observing through a green filter an incandescent filament by looking through an extinction cell containing the dispersion, moving the extinction cell in a light proof housing across the field of vision from the extinction point on one side of the point of maximum brightness to the extinction point on the other side thereof by means which indicate the amount of movement and observing the indicated amount of movement.

JOHN S. WARD.
SAMUEL D. GEHMAN.